United States Patent
Awad

(10) Patent No.: US 8,180,375 B2
(45) Date of Patent: May 15, 2012

(54) POTENTIAL CALL DROP INDICATOR

(75) Inventor: Mina Awad, Edison, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 1080 days.

(21) Appl. No.: 12/059,069

(22) Filed: Mar. 31, 2008

(65) Prior Publication Data
US 2009/0247137 A1    Oct. 1, 2009

(51) Int. Cl.
*H04W 24/00*    (2009.01)
(52) U.S. Cl. ............... 455/456.3; 455/422.1; 455/423; 455/456.1; 455/414.1
(58) Field of Classification Search ......... 455/422.1, 455/423, 456.1, 456.3, 414.1; 701/201, 117, 701/208
See application file for complete search history.

(56) References Cited

U.S. PATENT DOCUMENTS

| | | | |
|---|---|---|---|
| 6,332,077 B1 | 12/2001 | Wu et al. | 455/432 |
| 6,957,074 B2 | 10/2005 | Wang et al. | 455/456.1 |
| 7,184,765 B1 | 2/2007 | Birnie et al. | 455/432.3 |
| 7,259,666 B1 | 8/2007 | Hermsmeyer et al. | 340/517 |
| 7,929,905 B1 * | 4/2011 | Warner et al. | 455/7 |
| 2002/0029108 A1 * | 3/2002 | Liu et al. | 701/208 |
| 2004/0192341 A1 | 9/2004 | Wang et al. | 455/456.1 |
| 2005/0027436 A1 * | 2/2005 | Yoshikawa et al. | 701/117 |
| 2009/0228199 A1 * | 9/2009 | Bhogal et al. | 701/201 |

\* cited by examiner

*Primary Examiner* — Justin Lee
(74) *Attorney, Agent, or Firm* — Woodcock Washburn LLP

(57) ABSTRACT

Mobile device user notifications of highly likely call drops or service losses are provided. A wireless network can determine from the location history of a mobile device if that mobile device is likely to lose connectivity to the wireless network or to a particular wireless service and issue an alert to the user. The form of the alert can be through one of various types of mobile device messages, or through an application on the mobile device. The mobile device's location can be determined using the global positioning system. Alternative directions can be provided to the user so that the user can travel without losing connectivity. The user may provide a destination before beginning travel, and receive a suggested course of travel that keeps the user within a higher quality coverage area.

25 Claims, 8 Drawing Sheets

POTENTIAL CALL DROP INDICATOR

TECHNICAL FIELD

The technical field generally relates to communications systems and more specifically relates to systems and methods for predicting loss of wireless signal coverage and providing notification to a user prior to loss of coverage.

BACKGROUND

Today, mobile communications devices, such as mobile telephones, are commonplace. Yet despite their near-ubiquity, there are still many areas where mobile communications devices lack coverage or certain wireless services are unavailable, or coverage or service is not available from their home provider. The user of a device usually finds out about a lack of coverage when they move out of the coverage area and drop a call or loss a service. By the time the call or service is dropped, it is too late for the user to take steps to remain in the coverage area or take other actions in preparation for the termination of the ongoing communication. Current technologies do not predict for a user when the mobile device the user is operating is likely to lose network coverage or access to a network service, nor do they provide to a user notification of impending loss of coverage or service. Current technologies also do not provide to a user suggestions of how to deal with the call or communication before it is lost, or recommendations of actions which may allow the user to remain in the coverage area.

SUMMARY

Notifications of impending call drops, impending loss of connectivity to a wireless network or a particular wireless service, or traversing an area with other specific characteristics are provided to a user of a mobile device. The determination of an impending call drop or service loss may be made based on network statistics collected on areas around the predicted path or current location of the user and/or the mobile device. An estimated time and probability of loss of connectivity may be provided to the user. Along with the notification, suggested alternate routes may be provided to the user that keep the mobile device in higher quality network connectivity areas, thus reducing the probability of loss of network connectivity. In one embodiment, a user can provide the user's destination to a wireless network or device and be provided with a course from the user's current location to the user's desired destination that keeps the user within quality network connectivity areas. In another embodiment, network connectivity notifications are issued through a navigation system, and alternate course are provided through the navigation system, giving the user turn-by-turn directions to the user's destination via the alternate course.

Other objects, features, and advantages of the present invention will become apparent after review of the Brief Description of the Drawings, Detailed Description, and the Claims.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Figure 1:
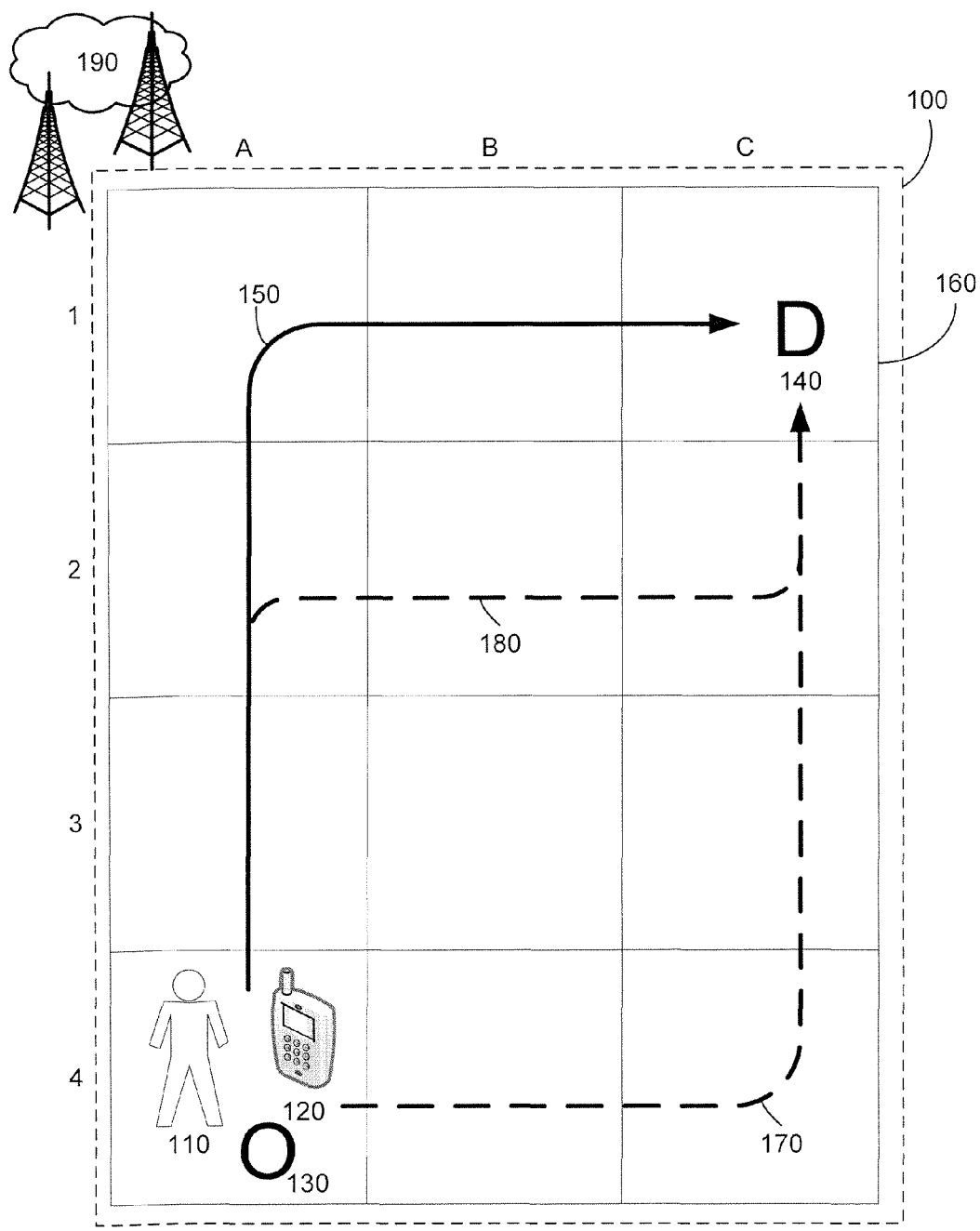
FIG. 1 is a block diagram of a user and an area in which the present method and system may be implemented.

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

For the purposes of the present disclosure, a user's home network is one or more networks operated by one or more telecommunications providers with which the user has contracted or otherwise arranged to provide mobile communications services. A home network may be operated by a single telecommunications provider or by a group of affiliated providers. The user's device may be manufactured for use specifically in the home network, and may be provided to the user by the home network provider. For the purposes of the present disclosure, a roaming network is any network other than a user's home network in which the user's mobile device may operate. A roaming network is typically operated by a telecommunications provider with which the user has no direct contract or arrangement. When using a roaming network, a user typically will be charged higher network usage fees than when using the user's home network.

A user of a mobile device may find it helpful to receive a notification that the user is soon to be leaving the wireless network coverage area. Such a notification may be helpful when the user is leaving the coverage area of the user's home network and going into roaming mode, or otherwise entering the coverage area of another network where the user's home network does not provide coverage. The notification may also be useful when the user is leaving the home network and going into an area with no wireless network coverage. In either situation, the user may experience a dropped call or interrupted communications. If the user is notified in advance that a call is likely to drop soon or a communication is soon to be interrupted, the user may be able to take actions in preparation for the interruption of the call or communication, or to prevent the interruption. Such actions may include altering the user's course of travel to remain within the wireless network coverage area and ending the call or communication intentionally, perhaps scheduling a time to resume the call or communication.

A user may also find it helpful to receive a notification that one or more services are likely to become unavailable. A network may not be able to provide all available services in all areas covered by the network. For example, data services may not be available in an area that is capable of providing voice services. A user performing data communications may want to know that data service is not going to be available if the user's current course is maintained. In some situations, paging services may be maintained while voice and data services may not be available. Any other combination of available and unavailable services are contemplated, and the present subject matter may be used to address any of those situations.

A device may also use information about impending loss of services. For example, a mobile device may detect or otherwise be made aware of an impending loss of service and automatically reduce power consumption, in one embodiment using a minimal amount of power to remain in contact with a network. In another embodiment, the device may automatically power off when detecting an impending loss of connectivity. Any actions that may be automatically taken by a mobile device based on an indication of an impending loss of one or more services or connectivity are contemplated as within the scope of the present disclosure.

FIG. 1 illustrates and exemplary, non-limiting area 100 in which the present disclosure may be implemented. Area 100 is an example of a geographical area in which a mobile communications device may be transported and/or operated. Area 100 may include portions which are covered by one or more wireless networks, enabling a mobile device to function in a home network, a roaming network, or both. Area 100 may also include portions which are not covered by any wireless network in which the user's mobile device can operate. Area 100 may also include portions that where all services from one or more wireless networks are available and portions where only a subset of offered services are available. The size and shape of area 100 can be any size and shape possible for a geographical area. Area 100 as illustrated in FIG. 1 is only exemplary and for purposes of description and is not intended to limit the present subject matter in any way.

In FIG. 1, user 110 may be operating mobile device 120 within area 100. User 110 may be traveling within area 100, starting at origination location 130, and traveling to destination location 140. User 110 is following original course 150. Original course 150 may be any path capable of being taken by a mobile device user, by using any means possible. For example, user 110 may be walking or traveling in an automobile. The specific mode or means of transportation does not affect the functionality of the present subject matter, and any means or modes of transportation are contemplated as within the scope of the present disclosure. Also illustrated in FIG. 1 is alternate course 170 and changed course 180. Like original course 150, alternate course 170 and changed course 180 may be any path capable of being taken by a mobile device user, by using any means possible. Original course 150, alternate course 170 and changed course 180 will be described in further detail below.

Mobile device 120 may be any wireless mobile communications device that communicates with other devices using a wireless network. Examples of such devices include, but are not limited to, mobile telephones, mobile computers, personal data assistants ("PDA"s), navigation systems, and wirelessly networked computers. Any device which can communicate with any other device by communicating, at least in part, wirelessly with a wireless network is contemplated as being within the scope of the present disclosure.

Mobile device 120 may include global positioning system ("GPS") components and/or software, enabling it to communicate with GPS satellites and determine its own location, speed, direction, and the current time. Mobile device 120 may be constructed such that it can communicate GPS-derived location and direction information to a telecommunications network, other devices, and/or user 110. Mobile device 120 may include other means of determining its own location, speed, and/or direction, including receiving such information from a telecommunications network, or deriving such information from the use of technologies well known to those skilled in the art that utilize one or more cellular towers and analysis of signal strength, time delays, angles of arrival, or other measurements to determine a device's location. Such locating means include, but are not limited to, triangulation and hyperbolic fixing schemes. Such locating means may use time delays between a mobile device and two or more cellular towers to determine a relatively precise location for the mobile device. The various means and methods of locating a device using cellular network measurements, including the use of time delay and/or signal strength to determine the location, speed, and/or direction of a mobile device, are well known to those skilled in the art, and therefore will not be recited herein. Any means of determining a mobile device's current or past location, speed, and/or direction are contemplated as within the scope of the present disclosure.

Area 100 is serviced, at least in part, by wireless provider network 190. A wireless provider provides network facilities to operate a wireless network in the form of wireless provider network 190 within area 100. Wireless provider network 190 may be any network that facilitates wireless communications, and any such network is contemplated as within the present disclosure. Examples of such networks include telephony radio networks such as global system for mobile communication ("GSM") networks and code division multiple access ("CDMA") networks, and wireless computer networks such as Wi-Fi and IEEE 802.11 networks.

Area 100 is overlaid by virtual grid 160. Grid 160 is not physically present in area 100, but serves as a logical tool for referencing sections of area 100. Grid 160 divides area 100 into sections that may be easily referenced by grid coordinates. For example, user 110 is beginning his journey at origination location 130, which is located in section A4 of grid 160. User 110 is traveling to destination location 140, which is located in section C1 of grid 160. Grid 160 serves only as an example of how an area, such as area 100, may be logically divided and referenced. Another example of how a geographical area may be divided and referenced is by ZIP codes. Yet another example of how a geographical area may be divided and referenced, particularly one served by a wireless telecommunications network, is by tower locations. For instance, the coverage area of each tower may be designated as a geographical division. Any other method or means of creating and referencing sections or portions of a geographical area are contemplated as within the scope of the present disclosure.

In one embodiment of the present subject matter, user 110 is provided with wireless telecommunications services by wireless provider network 190, which enables mobile device 120 to communicate wirelessly with wireless provider network 190 in at least some portions of area 100. Such wireless telecommunications services may include, but are not limited to, voice, data, paging, email, Internet access, or any other telecommunications service. In this exemplary embodiment, wireless provider network 190 may maintain historical wireless network statistics on the sections of area 100 where it provides wireless service. In another alternative embodiment, mobile device 120 may maintain historical wireless network statistics. Such statistics may be compiled and stored by mobile device 120 itself, or received from wireless provider network 190 and stored on mobile device 120. One example of such a statistic may be the amount of dropped calls. In one embodiment, the amount of dropped calls may be kept as a percentage of calls serviced in each area. In another embodiment, the amount of dropped calls may be a total amount over a predetermined time frame, for example the total number of dropped calls over the past 30 days in a section. In yet another embodiment, the network statistic may be the number of complaints received about a section of area 100. In still another embodiment, the network statistic may be the data rate typically experienced by data users in each area. In another embodiment, the network statistic may be the rate of lost data connections in each area. All other network statistics are contemplated as within the scope of the present disclosure. Any other methods or means of collecting and maintaining historical network statistics are contemplated as within the scope of the present disclosure.

In one embodiment, user 110 is traveling along original course 150 from origination location 130 to destination location 140 while using mobile device 120 to have a telephone conversation. In alternative embodiments, user 110 may be using mobile device 120 to send and/or receive text messages, send and/or receive emails, browse the internet, access other computer networks, or perform or participate in any other form of telecommunications. Any form of communications that may be performed using a wireless device or enabled over a wireless network is contemplated as within the scope of the present disclosure.

Original course 150 may be a path of travel, along public roads, walkways, private areas, or any other path of travel which user 110 may be traveling. Original course 150 may or may not have coverage by wireless provider 190, or may include areas or sections that have coverage as well as areas or sections that do not. Any path of travel is contemplated as within the scope of the present disclosure.

Wireless provider network 190 may track the course of user 110's travels through information gathered from mobile device 120. In one embodiment, mobile device 120 may be equipped with GPS components, and may periodically report its GPS coordinates to wireless provider network 190. In another embodiment, wireless provider network 190 uses triangulation to periodically determine the location of user 110. Other means and methods of determining a wireless user's location are contemplated.

After receiving one or more of such reports, wireless provider network 190 may predict one or more future courses of user 110. For example, if wireless provider network 190 receives a report that user 110 is in section A4 of area 100, followed by a report that user 110 is in section A3 of area 100, then wireless provider network 190 may predict that user 110 will soon be in section A2 of area 100. Alternatively, wireless provider network 190 may use received GPS coordinates of user 110 in conjunction with available mapping software to detect that user 110 is traveling on a road, and predict that user 110 will remain on the road. For example, if user 110 is on an interstate which follows the path of original course 150, wireless provider network 190 may predict that user 110 will go through sections A4, A3, A2, A1, B1, and C1 of area 100, in that order. Many methods and means of course prediction are available and known to those skilled in the art, and will not be recited herein. Any means or methods of predicting the future path of a mobile device user based on past location information may be used and are contemplated as within the scope of the present disclosure.

After predicting at least one future course for user 110, wireless provider network 190 may then compare the available wireless network statistics to the predicted course. For example, if wireless provider network 190 predicts that user 110 will go through sections A3, A2, and A1 of area 100, then wireless provider network 190 may obtain the dropped call statistics for each of those sections. Wireless provider network 190 may then examine the statistics and determine if any of these sections within the predicted course have unacceptable rates of dropped calls. Alternatively, wireless provider network 190 may obtain the dropped data connection statistics for each section and determine is any section within the predicted course has an unacceptable rate of lost data connections. Any other network statistic may be obtained and evaluated, and all such statistics are contemplated as within the scope of the present disclosure.

It is contemplated that any useful measurement of network statistics or threshold of network performance may be used to determine acceptability. For example, wireless provider network 190 may set the unacceptable dropped call or dropped data connection threshold at 50%. In this example, if section A1 of area 100 has an 80% dropped call rate, that is, 80% of calls taking place in section A1 are dropped, then wireless provider network 190 may issue a notification to user 110 via mobile device 120 that the current communication is likely to be dropped or a particular service is likely to be lost if user 110 continues on the predicted course.

In an alternative embodiment, mobile device 120 may determine its own location and predict its own course, and therefore the course of user 110. Any means and methods for a wireless device to predict its own course are contemplated as within the scope of the present disclosure. In an embodiment where mobile device 120 maintains or stores network statistics, mobile device 120 may then compare the available wireless network statistics to the predicted course. Mobile device 120 may then examine the statistics and determine if any of the sections within the predicted course have unacceptable rates of dropped calls. If mobile device 120 determines that the current course may encounter areas or sections with unacceptable rates of dropped calls, mobile device 120 may issue a notification to user 110 that the current communication is likely to be dropped if user 110 continues on the predicted course.

The notification provided to user 110 may be any of the known types of notifications currently in use with mobile devices, or any type of notification that alerts user 110 that the communication is soon to be dropped. In one embodiment, referring now to FIG. 2, a text message may be sent to mobile device 120, which may be accompanied by an audible notification so that user 110 can detect the notification while participating in a voice call. Message 220 may be displayed on mobile device display 210. Message 220 may notify user 110 that the call may be dropped or one or more services may be lost if user 110 continues in the current direction. The notification, in the form of message 220 in this example, may also provide an estimate to user 110 of approximately how long user 110 can maintain the current wireless connection or service before it is dropped. Such an estimate may be generated in any way known to those skilled in the art, and may take into account the direction and speed of user 110, as obtained, for example, from current and historical GPS coordinates or other GPS information gathered from mobile device 120. The notification may also include the likelihood or probability, for example in the form of a percentage, that the call will be dropped or that the service will be lost. This probability of a call drop or loss of one or more services may be derived, directly or indirectly, from the gathered network statistics.

In another embodiment, a software application may be installed and running on mobile device 120 which provided notifications to user 110 regarding call drop or service loss status. Message 220 illustrated in FIG. 2 may be provided to user 110 by such an application.

Other means and methods of notifying user 110 may be used. For example, a voice message may be injected into the stream of conversation, in one embodiment only audible to user 110, that informs user 110 that the call is likely to be dropped or service likely to be lost in the estimated time. Alternatively, an email may be sent to mobile device 120 alerting user 110 of the impending call drop or service loss. In yet another alternative a page maybe sent to mobile device 120 information user 110 that voice service may soon be lost. Any other means or methods of effectively conveying to user 110 that a service may be lost are contemplated as within the scope of the present disclosure.

In one embodiment, the notification of impending call drop or service loss is repeatedly sent to mobile device 120 as long as mobile device 120 continues to be actively participating in a communication. This will serve as a reminder to user 110 that steps should be taken to gracefully terminate the call or communication soon, or to take other steps to ensure that mobile device 120 stays within the coverage area of wireless provider network 190. In another embodiment, the probability of the call dropping or service loss and the estimated time of drop or loss is continuously updated, for example in real-time or near real-time at predetermined time increments, so that user 110 can be made aware of the current status of a potential call drop or loss of service.

In another embodiment, the notification may be issued when mobile device 120 is not active in a wireless communication. Such a notification may serve to notify user 110 that mobile device 120 will be in roaming mode, without one or more wireless services, or without wireless network coverage soon. This may be useful to user 110 in the event that user 110 needs to make a call or transmit some other form of communication, or if user 110 would like to stay within range of mobile device 120's home network.

Figure 2:
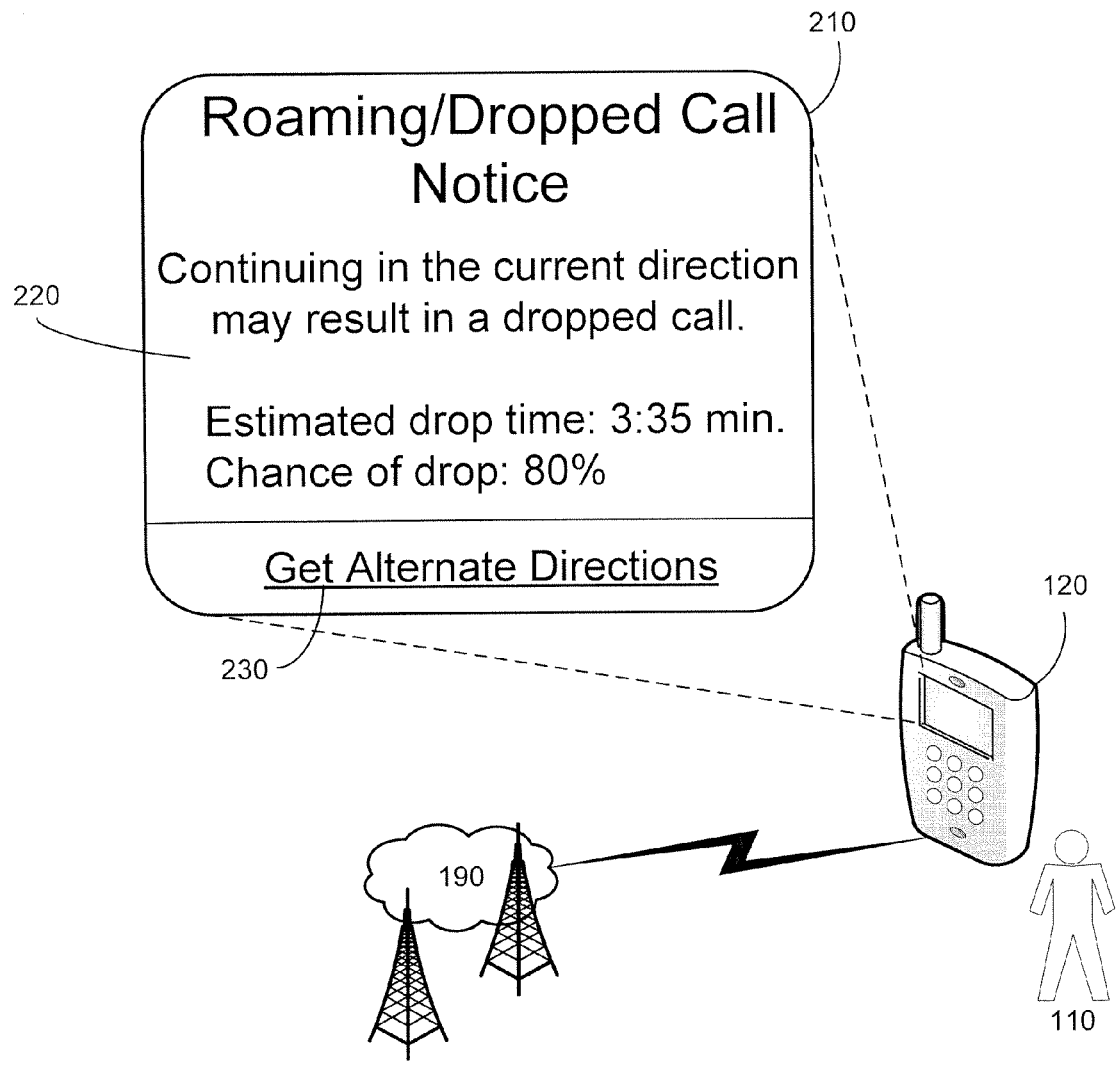
FIG. 2 is a block diagram of an exemplary, non-limiting notification provided to a user of an impending call drop.

The notification may be coupled with suggestions for alternate courses that would allow user 110 to remain within wireless provider network 190's coverage area, or it may be coupled with options to acquire such alternate course suggestions. In FIG. 2, message 220 is accompanied by alternate directions option 230. User 110 may select, click on, or otherwise activate alternate directions option 230 to obtain alternate directions. For example, and referring again to FIG. 1, if a notification is provided to user 110 while user 110 is traveling through section A3 of area 100, and user 110 selects alternate directions option 230, directions may be provided to user 110 through mobile device 120 directed user 110 to travel on changed course 180. Changed course 180 may be derived and provided to user 110 through various means known to those skilled in the art, including using available mapping and GPS software which may provide turn-by-turn driving directions.

In another embodiment, the notification may be coupled with an option for user 110 to provide destination location 140 to wireless provider network 190. By obtaining user 110's destination location 140, wireless provider 190 can determine a more precise changed course 180 that will allow user 110 to travel through areas with higher quality or more complete wireless network coverage.

Changed course 180 may be determined in part by examining network statistics to derive a course that remains in higher quality coverage sections of area 100. Such network statistics may be compared to potential courses that lead to the predicted destination to determine the shortest, or otherwise optimal, course or courses which travel through contiguous quality coverage areas or sections or areas or sections that offer the services of interest to user 110. For example, after predicting or learning that user 110's destination location 140 is in section C1 of area 100, wireless provider network 190 may determine that, while user 110's original course 150 brings user 110 through section A1 of area 100 which has an 80% dropped call rate, if user 110 were to travel from section A2 through section B2 and C2 on the way to section C1, following changed course 180, the likelihood of the call dropping would be much less. This may be because sections B2 and C2 have much lower dropped call rates than section A1.

In another embodiment, directions for a course that keeps user 110 within the coverage area of wireless provider network 190 may be provided by default to user 110 through mobile device 120, and without requiring user 110 to take any actions to obtain such directions. In yet another embodiment, the directions provided to user 110 may be cardinal or ordinal directions. For example, the suggested alternate course directions may be to go North, West, or Southeast.

In an alternative embodiment, user 110 provides destination location 140 to wireless provider network 190 before beginning to travel on original course 150. Destination location 140 maybe provided to wireless provider network 190 in any effective manner, including inputting it in mobile device 120 and transmitting it to wireless provider network 190 through the use of a software application loaded on mobile device 120, or through a web page or web form viewed or completed via mobile device 120. Any other means or methods of providing destination location 140 to wireless provider network 190 is contemplated as within the scope of the present disclosure. User 110 may also provide origination location 130 to wireless provider network 190, or wireless provider network 190 may derive origination location 130 via means discussed herein, including by acquiring the GPS coordinates of mobile device 120 or locating mobile device 120 through triangulation.

Figure 3:
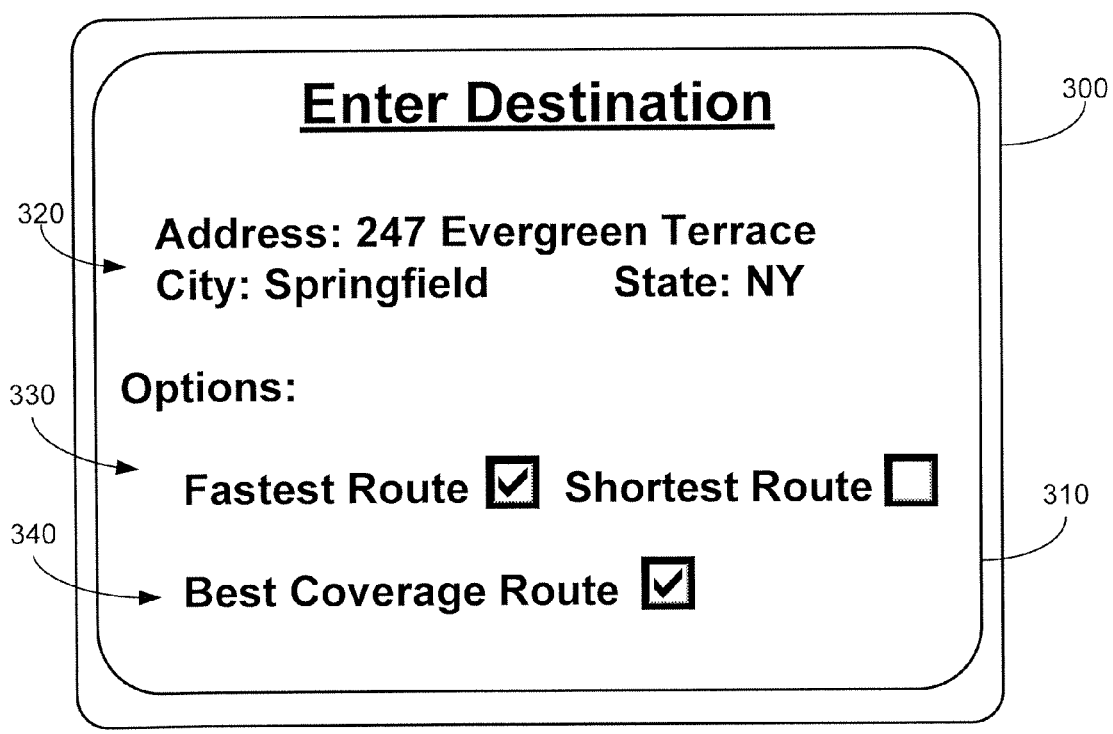
FIG. 3 is a block diagram of an exemplary, non-limiting navigation system in which the present subject matter may be implemented.

In one embodiment, destination location 140 may be provided to a GPS capable device, such as a navigation system, which is wirelessly enabled. Referring now to FIG. 3, in this embodiment, navigation system 300 may have components integrated into it, or it may provide an interface for a wireless device such as mobile device 120. Navigation system 300 may take into account network coverage areas when determining a path for user 110. User 110 may enter destination address 320 into navigation system 300, which may be displayed on navigation system display 310. User 110 may have options 330 to choose from after or during the entering of destination address 320. Among options 330, user 110 may be able to select best coverage route option 340. Selecting best coverage route option 340 would direct navigation system 300 to select a route to destination address 320 which provides the best wireless network coverage available. Referring again to FIG. 1, navigation system 300 may provide directions to user 110 that follow alternate course 170, thereby keeping user 110 and mobile device 120 within the higher quality coverage section of area 100 on the way to destination location 140, which may correspond to destination address 320.

Alternatively, navigation system 300 may be instructed or configured to provide coverage notifications as described herein with respect to FIG. 2 during its period of activity as user 110 travels.

Figure 4:
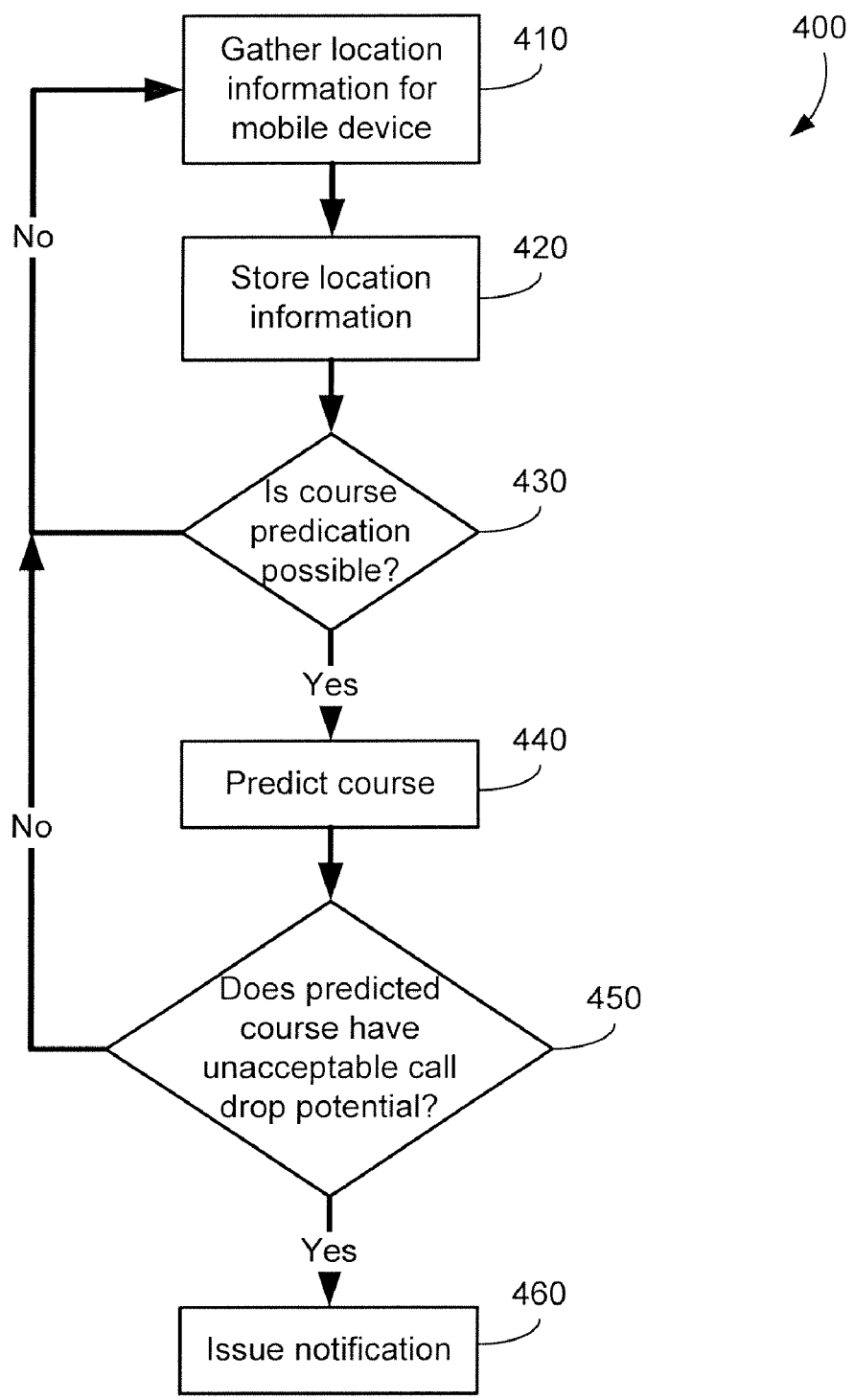
FIG. 4 is a flow diagram of an exemplary, non-limiting method of implementing the present subject matter.

In FIG. 4, a non-limiting exemplary method 400 of providing impending dropped call or service loss notification is illustrated. Any or all portions of the exemplary method illustrated in FIG. 4 may be performed on either a wireless communications device such as mobile device 120 or on telecommunications network equipment. At block 410, location information for a mobile device is gathered. This may be location information received from the mobile device by telecommunications network equipment, where the mobile device has determined its own location through any of the available means known to those skilled in the art. For example, a mobile device with GPS components and/or software may acquire its GPS coordinates from a communication, directly or indirectly through other devices or equipment, with a GPS satellite, and transmit those coordinates to a wireless provider. Alternatively, a wireless provider may calculate the location of a mobile device through the use of triangulation. In yet another alternative, the mobile device may perform all the functions of the subject matter described herein and therefore the mobile device may not transmit its location information anywhere. In still another embodiment, other information is gathered along with, or instead of, location information. Such information may include a direction traveled, a speed of travel, a time or length of travel, distance covered, geographical or other orientation, or any other useful information regarding the position and/or direction of movement of a mobile device. Such information may also include user preferences, such as the wireless services of most importance to the user. Any means or methods of locating or collecting information on a mobile device, and any type of information that may be collected, are contemplated as within the scope of the present disclosure.

At block 420, the location information, or any other relevant information, gathered at block 410 is stored. Such information may be stored on a server, computer, network device, or on any other device capable of maintaining a record of data. Alternatively, such information may be stored on the mobile device itself. Along with the location or other gathered information, other helpful information may be stored, such as a timestamp and mobile device identifier. Any useful additional information and any means of storing such information is contemplated as within the scope of the present disclosure.

At block 430, a determination is made as to whether, given the location information gathered and stored at blocks 410 and 420, a prediction can be made about the course of travel of the mobile device. For example, if only one piece of location information has been obtained, then it may be difficult to predict the mobile device's current course. Alternatively, one piece of location information coupled with direction and speed data may provide sufficient data to predict a course. In another alternative, a threshold may be set limiting course prediction to only situations where a minimum amount of location data has been acquires, such as five location data points. Any means or methods of determining whether sufficient data exists to predict a course are contemplated. This determination may be made on a mobile device, such as mobile device 120, or on a device or devices within a telecommunications network. If it is determined that sufficient data does not exist to predict a course, then further data is collected by returning to block 410.

If a course prediction is possible, then at block 440, the course is predicted. As discussed herein, this may be accomplished in any effective way. For example, course prediction may be strictly directional, and the predicted course may be based solely on the current direction of travel of the mobile device. Alternatively, course prediction may be based on maps, such as those available to navigation systems, and presume that the course of travel follows the current road on which the user and the mobile device are traveling. Other means of course prediction are known to those skilled in the art, and all such means and methods are contemplated as within the scope of the present disclosure. Course prediction may be performed on a mobile device, such as mobile device 120, or on a device or devices within a telecommunications network.

At block 450, a determination is made about whether the predicted course takes the user through an area with an unacceptable potential for dropped calls or loss of a wireless service. As described above, many methods and means of determining whether an area has an unacceptable rate of service loss are possible and known to those skilled in the art, and all such methods and means are contemplated as within the scope of the present disclosure. This determination may be made on a mobile device itself, such as mobile device 120, or on a device or devices within a telecommunications network. If no unacceptable call drop or service loss rates are determined for the predicted course, location information gathering resuming by returning to block 410.

If unacceptable call drop or service loss rates are found over the predicted course, then, at block 460, a notification is issued. As described above, the notification may be a text message, an email, a voice message, a page, or may be provided to the user through an application operating on the user's mobile device. Any other means or methods of providing a notification may be employed, and all are contemplated as within the scope of the present disclosure. The notification may be generated on a device within a telecommunications network and delivered to a mobile device, or it may be originate on a mobile device. Furthermore, other options may be offered or provided to the user, such as alternative directions.

All of the methods and processes described herein in regard to providing notification to a user about pending call drops based on the user's predicted course of travel may be performed entirely on the mobile device, entirely on the provider network, or using a combination of the two.

Those skilled in the are will recognize that the present subject matter maybe applied to any network characteristic that may vary within a coverage area. Notifications may be provided to any user of a wireless network and/or device that alert the user to a change in any particular network characteristic or quality. All such characteristics, network qualities, and notifications are contemplated as within the scope of the present disclosure.

Those skilled in the art will also recognize that notifications and/or indications of impending loss of one or more services or connectivity to a network may also be used by a mobile device to make adjustments on the mobile device. For example, a mobile device may automatically adjust power to accommodate a weaker connection to a network, or a loss of a connection to a network. Any other adjustments triggered by a detected network characteristic may be initiated by a mobile device, and all such adjustments are contemplated as within the scope of the present disclosure.

Figure 5:
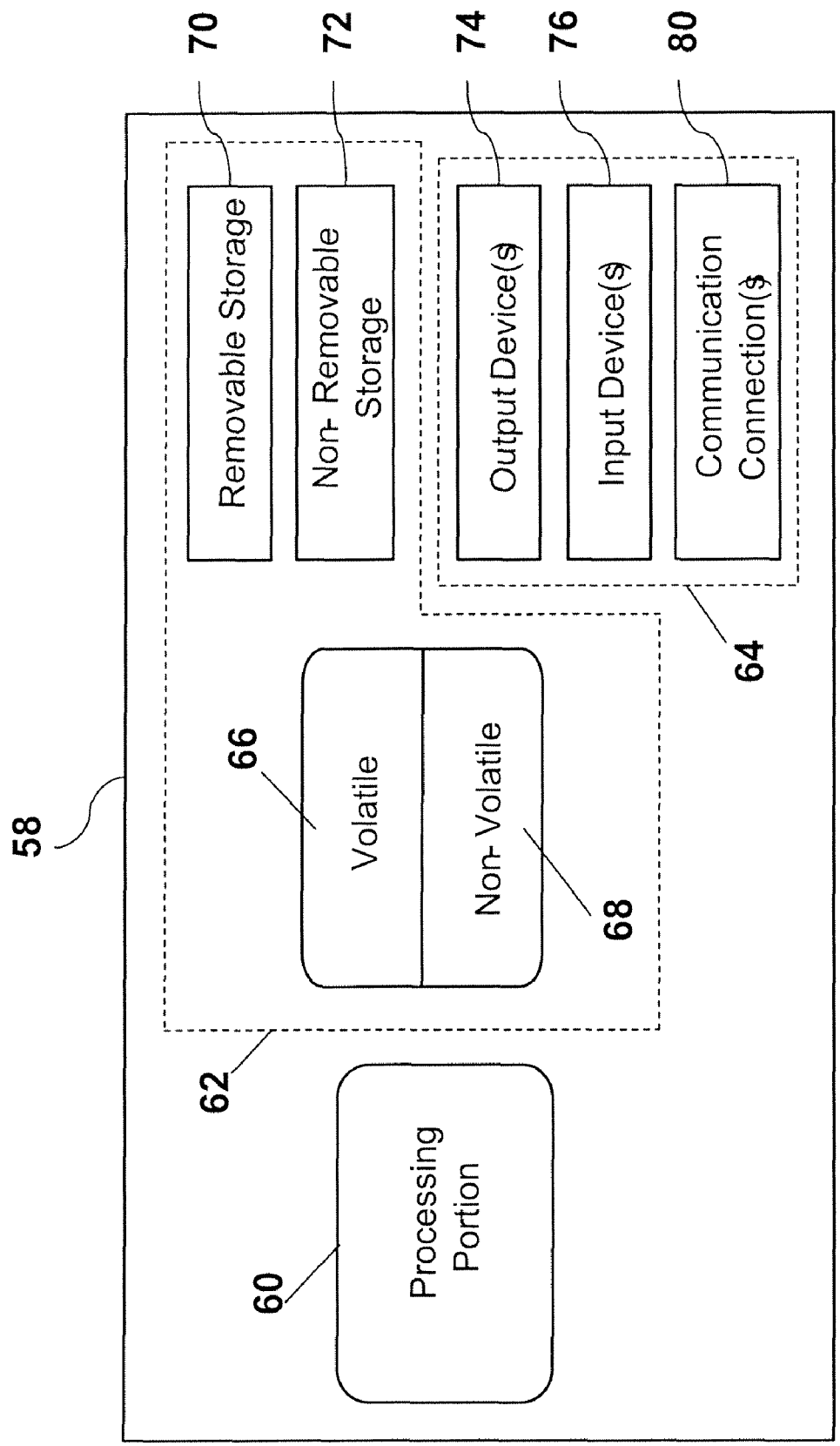
FIG. 5 is a block diagram of an example processor for generating and/or determining and transmitting and/or receiving call drop predictions and user notifications.

FIG. 5 is a block diagram of an example processor 58 for generating and/or determining mobile device location information and course prediction and generation and transmitting or receiving such information as well as user notifications regarding potential call drops and/or loss of connectivity to a wireless network. In an example configuration, the processor 58 may be one or more components of mobile device 120, navigation system 300, and devices within wireless provider network 190. It is emphasized that the block diagram depicted in FIG. 5 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 5) to allow communications therebetween. The input/output portion 64 is capable of providing and/or receiving components utilized to determine or generate mobile device location information and course prediction and generation and transmit or receive such information as well as user notifications. For example, the input/output portion 64 is capable of providing/receiving mobile device 120 location information, determining the predicted course of mobile device 120, transmitting/receiving notifications of impending call drops, processing requests for alternative courses, and executing programs and applications related to course predication and generation and call drop notifications, or any combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with determining or generating mobile device location information and course prediction and generation and transmitting or receiving such information as well as user notifications. For example, as described above, the memory portion is capable of storing user device location information, predicted and alternate courses, applications and software to generate or retrieve user device location information and predicted and alternate courses, or any combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain the communications connection(s) 80 that allow the processor 58 to communicate with other devices, for example through wireless provider network 190. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 58 also can have input device(s) 76 such as keyboard, keypad, mouse, pen, voice input device, touch input device, etc. Output device(s) 74 such as a display, speakers, printer, etc. also can be included.

The following description sets forth some exemplary telephony radio networks and non-limiting operating environments in which caller identification and caller geographical location information can be implemented. The below-described operating environments should be considered non-exhaustive, however, and thus the below-described network architectures merely show how caller identification with caller geographical location information can be incorporated into existing network structures and architectures. It can be appreciated, however, that potential call drop notification and course prediction and generation can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of potential call drop notification and course prediction and generation can be applied independently of the method for data transport, and do not depend on any particular network architecture, or underlying protocols.

Figure 6:
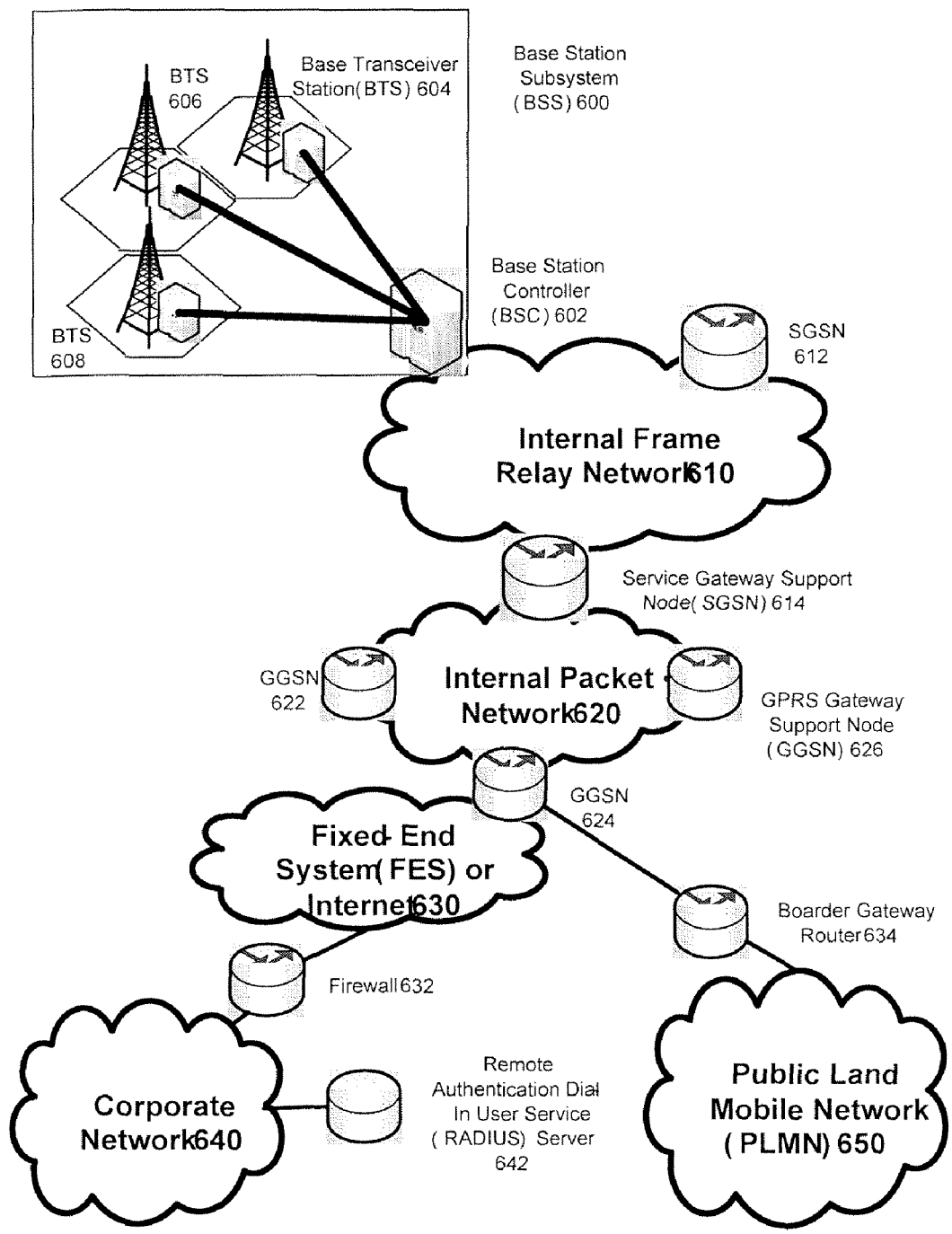
FIG. 6 is an overall block diagram of an exemplary packet-based mobile cellular network environment, such as a GPRS network, in which call drop predictions and user notifications can be implemented.

FIG. 6 depicts an overall block diagram of an exemplary packet-based mobile cellular network environment, such as a GPRS network, in which the system for potential call drop notification and course prediction and generation can be practiced. In an example configuration, wireless provider network 190 comprises a cellular radio network and towers which are encompassed by the network environment depicted in FIG. 6. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 120) become connected to the wireless network. In exemplary fashion, the packet traffic originating from user devices (e.g., mobile device 120) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 7:
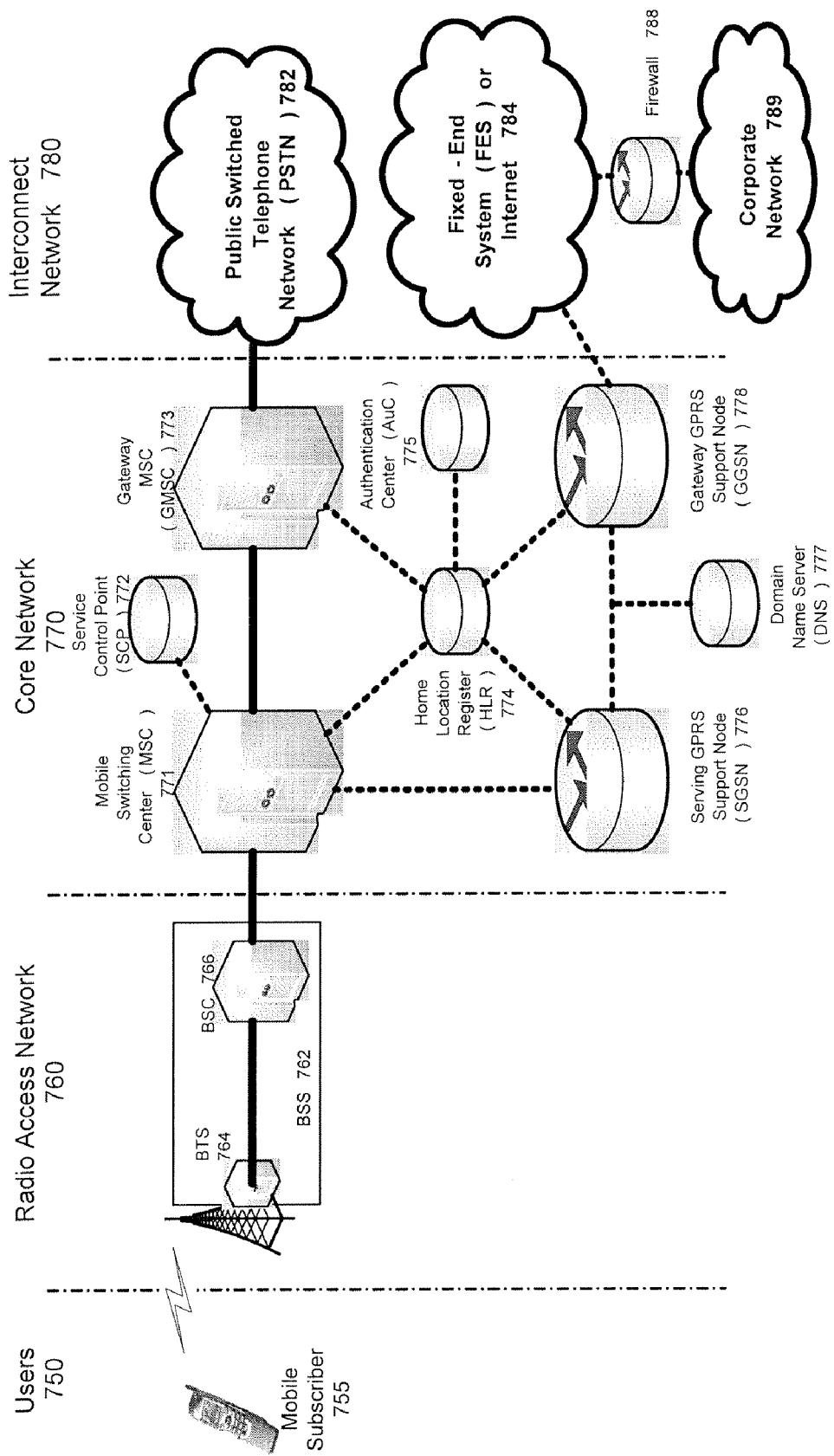
FIG. 7 illustrates an architecture of a typical GPRS network as segmented into four groups.

FIG. 7 illustrates an architecture of a typical GPRS network as segmented into four groups: users 750, radio access network 760, core network 770, and interconnect network 780. In one example configuration, wireless provider network 190 is encompassed by the radio access network 760, core network 770, and interconnect network 780. Users 750 comprise a plurality of end users (though only mobile subscriber 755 is shown in FIG. 7). In an example embodiment, the device depicted as mobile subscriber 755 comprises mobile device 120. In an alternate embodiment, the device depicted as mobile subscriber 755 comprises navigation system 300. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 7, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user, such user 110, and sometimes to the actual portable device, such as mobile device 120 or navigation system 300, used by an end user of the mobile cellular service. When a mobile subscriber turns on his or her mobile device, the mobile device goes through an attach process by which the mobile device attaches to an SGSN of the GPRS network. In FIG. 7, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 7) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of caller identification with caller geographical location information can include but are not limited to Gateway GPRS Support Node tables, Fixed End System router tables, firewall systems, VPN tunnels, and any number of other network elements as required by the particular digital network.

Figure 8:
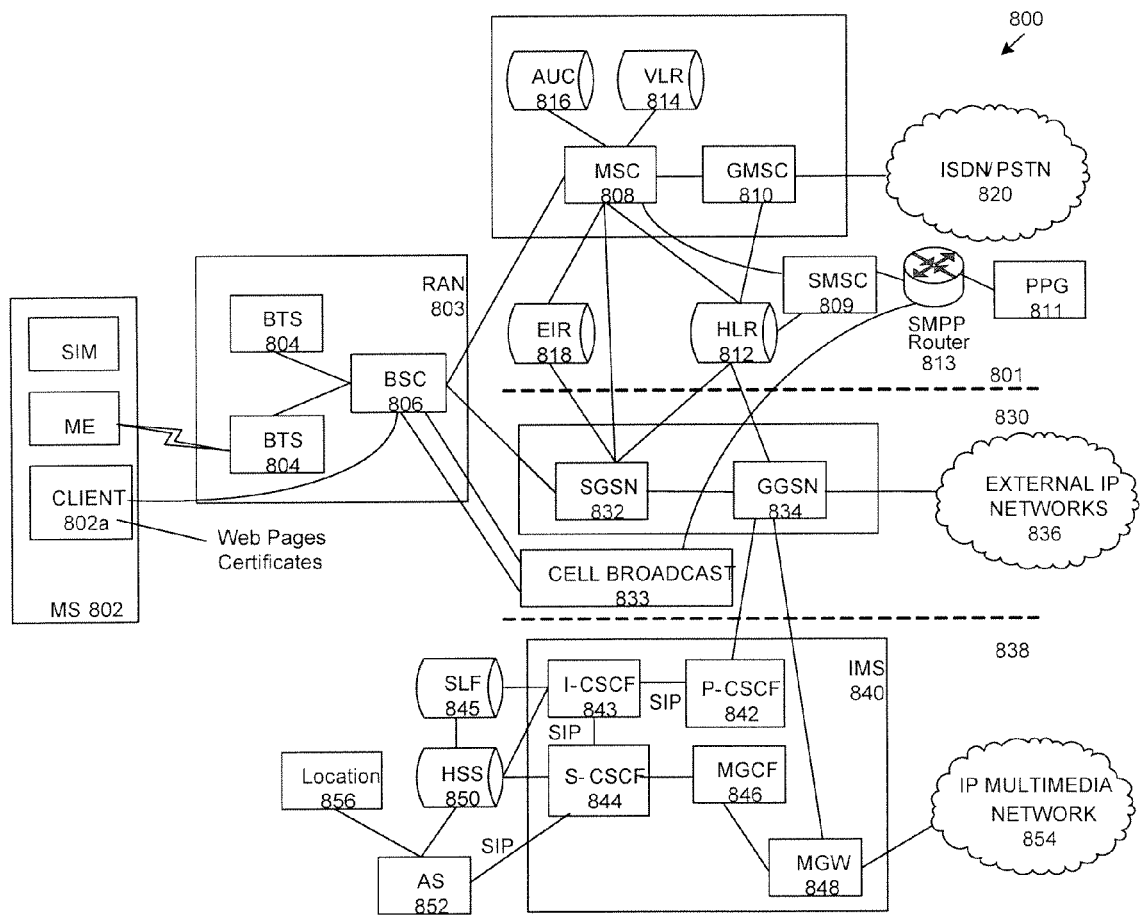
FIG. 8 illustrates an example alternate block diagram of an exemplary GSM/GPRS/IP multimedia network architecture in which call drop predictions and user notifications can be implemented.

FIG. 8 illustrates another exemplary block diagram view of a GSM/GPRS/IP multimedia network architecture 800 in which potential call drop notification and course prediction and generation can be incorporated. As illustrated, architecture 800 of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 120) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AUC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification.)

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown.) It also controls the media gateway (MGW) 848 that provides user-plane interworking functionality (e.g., converting between AMR- and PCM-coded voice.) The MGW 848 also communicates with other IP multimedia networks 854.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of potential call drop notification and course prediction and generation have been described in connection with various computing devices, the underlying concepts can be applied to any computing device or system capable of implementing predetermined potential call drop notification and course prediction and generation. The various techniques described herein can be implemented in connection with hardware or software or, where appropriate, with a combination of both. Thus, the methods and apparatus for determining or generating mobile device location information and course prediction and generation and transmitting or receiving such information as well as user notifications, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing mobile device location information and course prediction and generation. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for potential call drop notification and course prediction and generation also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing potential call drop notification and course prediction and generation. When implemented on a general-purpose processor, the program code combines with the processor to provide a unique apparatus that operates to invoke the functionality of potential call drop notification and course prediction and generation. Additionally, any storage techniques used in connection with potential call drop notification and course prediction and generation can invariably be a combination of hardware and software.

While potential call drop notification and course prediction and generation has been described in connection with the various embodiments of the various figures, it is to be understood that other similar embodiments can be used or modifications and additions can be made to the described embodiment for performing the same function of providing potential call drop notification and course prediction and generation without deviating therefrom. For example, one skilled in the art will recognize that a system for implementing potential call drop notification and course prediction and generation as described may apply to any environment, whether wired or wireless, and may be applied to any number of devices connected via a communications network and interacting across the network. Therefore, potential call drop notification and course prediction and generation should not be limited to any single embodiment, but rather should be construed in breadth and scope in accordance with the appended claims.

What is claimed:

1. A method comprising:
predicting a course of a mobile device;
collecting course network statistics on network coverage areas surrounding the course;
predicting that the course will traverse an area with an unacceptable rate of dropped calls by determining that a rate of dropped calls in the network coverage areas surrounding the course exceeds a predetermined threshold; and
in response to predicting that the course will traverse an area with the unacceptable rate of dropped calls, providing, to the mobile device, an indication of a predicted loss of network connectivity.

2. The method of claim 1, wherein predicting the course comprises:
accessing a history of global positioning system (GPS) coordinates of the mobile device;
obtaining current GPS coordinates of the mobile device; and
predicting the course of the mobile device in accordance with the accessed and obtained GPS coordinates.

3. The method of claim 1, wherein predicting the course comprises:
maintaining a history of the mobile device's location, determined based on network measurements, over a period of time;
obtaining a current location of the mobile device, determined based on network measurements, and
predicting the course based on the history and the current location.

4. The method of claim 1, further comprising:
determining at least one alternate course, the at least one alternate course predicted to traverse an area not having the unacceptable rate of dropped calls; and
providing the at least one alternate course to the mobile device.

5. The method of claim 4, wherein the at least one alternate course is provided to the mobile device as turn-by-turn driving directions.

6. The method of claim 4, wherein the at least one alternate course is provided to the mobile device in the form of at least one of a cardinal and an ordinal direction.

7. The method of claim 1, further comprising providing to the mobile device a time estimate of an occurrence of the predicted loss of network connectivity.

8. The method of claim 1, wherein the course network statistics comprise a ratio of dropped calls to total calls.

9. A system comprising:
at least one memory; and
at least one processor in communication with the at least one memory, wherein the at least one processor is configured to:
predict a course of a mobile device;
collect course network statistics on network coverage areas surrounding the course;
predict that the course will traverse an area with an unacceptable rate of dropped calls by determining that a rate of dropped calls in the network coverage areas surrounding the course exceeds a predetermined threshold;
in response to predicting that the course will traverse the area with the unacceptable rate of dropped calls, provide, to the mobile device, an indication of a predicted loss of network connectivity.

10. The system of claim 9, wherein the at least one processor is further configured to provide a time estimate of the predicted loss of network connectivity.

11. The system of claim 9, wherein the course network statistics comprise a ratio of dropped calls to total calls.

12. The system of claim 9, wherein the at least one processor is further configured to provide a current probability of a dropped call to the mobile device.

13. The system of claim 9, wherein the at least one processor is further configured to:
determine at least one alternate course, the at least one alternate course predicted to traverse an area without the unacceptable rate of dropped calls; and
provide the at least one alternate course to the mobile device.

14. The system of claim 13, wherein the at least one processor configured to determine the at least one alternate course further comprises the at least one processor configured to:
collect potential course network statistics on network coverage areas surrounding a plurality of potential courses; and
determine if the potential course network statistics indicate the unacceptable rate of dropped calls for each of the plurality of potential courses; and
select the at least one potential course from among the plurality of potential courses that does not correspond to potential course network statistics that indicate the unacceptable rate of dropped calls.

15. The system of claim 13, wherein the at least one processor configured to provide the at least one alternate course to the mobile device comprises the at least one processor configured to display on the mobile device an option to request the at least one alternate course.

16. A non-transitory computer-readable medium, the non-transitory computer-readable medium having stored thereon computer-executable instructions for:
predicting a course of a mobile device;
collecting network statistics on network coverage areas surrounding the course;
predicting that the course will traverse an area with an unacceptable rate of dropped calls by determining that a rate of dropped calls in the network coverage areas surrounding the course exceeds a predetermined threshold; and in response to predicting that the course will traverse an area with the unacceptable rate of dropped calls, providing to the mobile an indication of a predicted loss of network connectivity.

17. The non-transitory computer-readable medium of claim 16, wherein the non-transitory computer-readable medium is configured on a navigation system.

18. The non-transitory computer-readable medium of claim 16, further comprising computer-executable instructions for providing at least one alternate course to the mobile device.

19. The non-transitory computer-readable medium of claim 16, further comprising computer-executable instructions for:
- collecting current location network statistics on a current location network coverage area;
- determining a current probability of a dropped call based on the current location network statistics; and
- providing to the mobile device the current probability of a dropped call.

20. The non-transitory computer-readable medium of claim 19, further comprising providing to the mobile device near real-time status on a probability of a dropped call by repeatedly performing the steps of claim 19 at predetermined increments of time.

21. A mobile communications device, comprising:
- an antenna;
- a transceiver coupled to said antenna for transmitting to, and receiving transmissions from, a wireless network; and
- a processor configured to:
  - predicting a course of the mobile communications device;
  - collecting course network statistics on network coverage areas surrounding the course;
  - predicting that the course will traverse an area with an unacceptable rate of dropped calls by determining that a rate of dropped calls in the network coverage areas surrounding the course exceeds a predetermined threshold; and
  - in response to predicting that the course will traverse an area with the unacceptable rate of dropped calls, instructing a display to display an indication of a predicted loss of network connectivity.

22. The mobile communications device of claim 21, wherein the processor further instructs the display to display alternate course directions.

23. The mobile communications device of claim 21, further comprising global positioning system (GPS) components, the GPS components configured to determining a location of the mobile communications device.

24. The mobile communications device of claim 23, wherein the location of the mobile communications device is transmitted to the wireless network.

25. The mobile communications device of claim 21, further comprising an input for receiving a destination location.

* * * * *